June 23, 1959 P. G. BRIGGS 2,892,185

INFORMATION STORAGE APPARATUS

Filed Feb. 19, 1957 3 Sheets-Sheet 1

INVENTOR
PETER GEORGE BRIGGS
BY Kane and Nydick
ATTORNEYS

June 23, 1959 P. G. BRIGGS 2,892,185

INFORMATION STORAGE APPARATUS

Filed Feb. 19, 1957 3 Sheets-Sheet 2

INVENTOR
PETER GEORGE BRIGGS
BY Haume and Nydick
ATTORNEYS

June 23, 1959 P. G. BRIGGS 2,892,185

INFORMATION STORAGE APPARATUS

Filed Feb. 19, 1957 3 Sheets-Sheet 3

INVENTOR
PETER GEORGE BRIGGS
BY Haseltine and Nydick [signature]
ATTORNEYS 2,892,185

INFORMATION STORAGE APPARATUS

Peter George Briggs, Tewin, Welwyn, England, assignor to The British Tabulating Machine Company Limited, London, England, a British company Application February 19, 1957, Serial No. 641,217

Claims priority, application Great Britain April 6, 1956

18 Claims. (Cl. 340—174)

The present invention relates to information storage apparatus.

In electrical or electronic equipment it is frequently desirable to change data in one form to data in a second different form, e.g. from pairs of signals to single signals having time positions dependent upon the relative time positions of the signals of the corresponding pairs of signals.

This requirement arises, for example, in the case of a printing mechanism the input to which is derived by sensing a punched card which may have a single punchings or pairs of punchings in each column to represent numeric or alphabetic data, and in which each required character is printed under control of a signal occurring at a predetermined time in a cycle. In this case a storage arrangement is required which will accept the data entered by a card sensing mechanism and which will provide, on read-out, timed pulses for actuating the printing mechanism at instants when such actuation will result in the printing of characters corresponding to the data stored.

It is an object of the invention to provide an improved information storage device.

It is a further object to provide an improved information storage device employing a plurality of individual storage elements arranged in matrix formation.

It is a still further object to provide an improved information storage device for use with a cyclically operating recording device.

According to one aspect of the invention an information storage device includes a plurality of storage elements, each settable to either of two stable states, arranged in rows and columns, information entry means for each row and column of elements, each element being adapted to be fed to a first stable state under joint control of the information entry means for the row and column in which that element is located, means coupling the storage elements of a column in chain formation, means for applying a succession of pulses to the last element in the chain to generate an output signal in response to an applied signal if that element is in a pre-determined state and means for applying pulses to the other elements of the chain to transfer the settings of said other elements to said last element. The information storage device may also include two groups of storage elements, of which the second is arranged as described, and in which means is provided to switch the elements of the first group to the second stable state in a predetermined sequence and to generate a first signal in response to the switching of an element from the first to the second stable state, and means as described to generate an output signal from the last element in the chain of the second group under control of the first signal.

According to another aspect of the invention an information storage device includes two groups of magnetic storage cores of material having a substantially rectangular hysteresis characteristic, the cores being arranged in rows and columns, each column including cores of both groups, a group of first windings each linked with all the cores of a row, a group of second windings each linked with all the cores of a column, means in each column coupling the cores of the second group in a chain formation, information entry means adapted to set two cores in a column to a first stable state, one set core being in each of the first and second groups, by jointly energising selected ones of said first and second groups of windings, first means adapted to switch the cores of the first group of said column to a second stable state in a pre-determined sequence and to generate a first signal in response to the switching of a core from the first to the second stable state, a group of shifting windings, all the cores of the said second group in a column being linked by a single shift winding, means for applying a train of pulses to said group of shifting windings, means for rendering said pulses effective to cause successive transfer of the settings of the cores of the chain to the last core of the chain under control of said first signal and means for deriving an output signal from said last core. The information storage device may also be used with a cyclically operated recording device to which the said output signal is applied, the said cores of the first group being switched to the second stable state under control of the recording device, and means being provided for deriving a train of pulses from the recording device, the train of pulses being applied to cause sequential switching of the cores of the second group.

The invention will now be described with reference to the accompanying drawings, in which:

Figures 1 and 2 arranged one above the other form a circuit diagram.

The invention will be described as embodied in a machine for actuating a recording device from data recorded on standard punched cards having twelve index points in two groups, one of which represents the numeral characters 1 to 9 and the other of which provides three "zone" index points, O, X and Y which are used in conjunction with the numeral index points to represent alphabetic characters, and are used alone to represent other symbols. Additionally the "1" index point may have either numeral or "zone" significance in dependence upon whether it is used alone or not. The punching in any column of the card can thus be a single hole in either group or a pair of holes one of which is in each group, the "1" index point being considered as part of both groups. The recording device may be a printer or recording may take an alternative form, for example, punching, the recording device being actuated by an output pulse which represents information by reason of its timing. In the embodiment described herein a printer is used of the kind employing continuously rotating type wheels bearing alphabetic, numeral and other symbols, the selection of a symbol for printing being effected by actuating a hammer at a time when such symbol is in the printing position. Printers of this kind are well known and one such printer is, for example, described in a paper entitled "High Speed Printing Equipment" by L. Rosen, published in a "Review of Input and Output Equipment used in Computing Systems" by the American Institute of Electrical Engineers in March 1953. The printer is not shown in detail in the accompanying drawings which show simply the card sensing mechanism in schematic form and the circuit details of a two column store in accordance with the invention.

Figure 1:
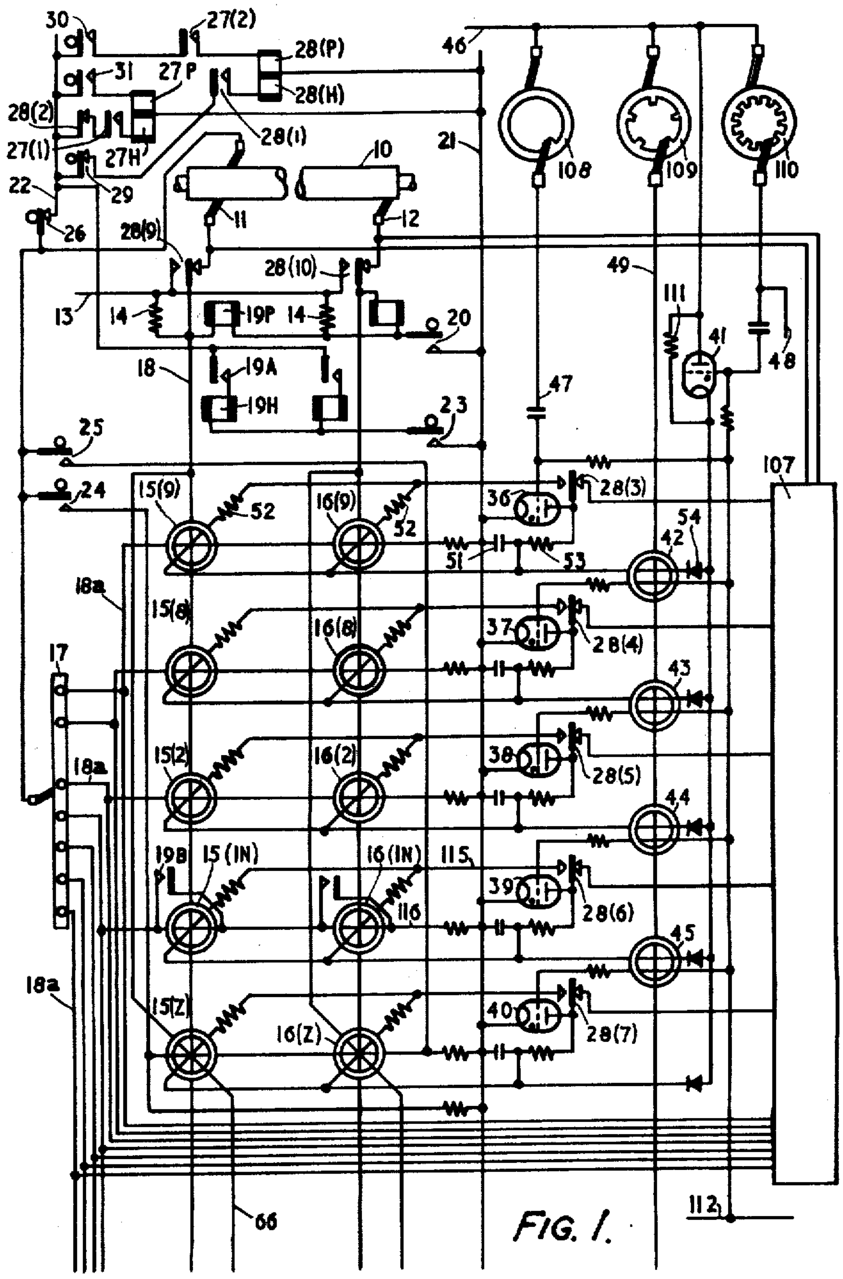
Figure 2:
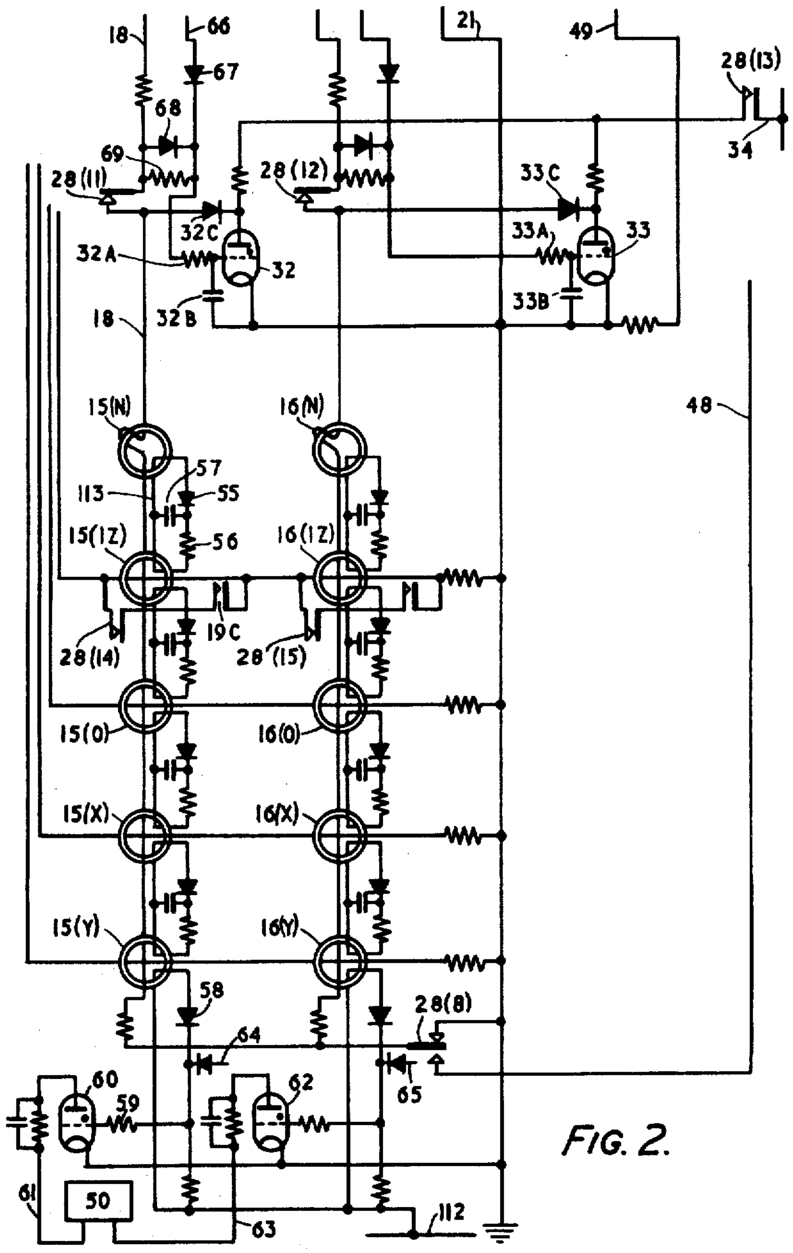

Referring to Figures 1 and 2, the card sensing mechanism indicated schematically at 10 has brushes 11, 12 for sensing holes in two columns of the card to cause selective operation of two columns 15 and 16 respectively of a magnetic core matrix, when a hole is sensed. It will be appreciated that for sensing a standard card of eighty columns, eighty brushes such as 11 and 12, and eighty columns of cores such as 15 and 16 would be provided. Each column of cores includes a first group of cores, one core for each of the numeral index points 9 to 1, and the core 15(Z). For clarity only those cores corresponding to index points 9, 8, 2 and 1 have been shown and these are indicated by the references 15(9), 15(8), 15(2) and 15(1N) and similarly for core column 16. A second group of cores is provided for each column, a core for the zone significance of index point 1 e.g. 15(1Z), a core for each of the zones O, X, and Y e.g. 15(O), 15(X) and 15(Y), and an additional core 15(N).

The two cores 15(Z) and 15(N) respectively, provide a pseudo zone indication when only a numeral hole is sensed from the card, and a pseudo numeral indication when only a zone hole is sensed from the card.

The individual cores are of a magnetic material exhibiting a substantially rectangular hysteresis characteristic and may thus be switched to either one of two stable states of magnetisation by signals applied to windings on the cores to register such signals in the matrix as a pattern of cores set in the two states. These two stable states will be referred to as the set and unset states of the cores. The matrix cores except the pseudo zone and pseudo numeral cores 15(Z), 16(Z), 15(N) and 16(N) are set by two half currents through two setting windings, and are arranged so that a half current through only one winding is insufficient to effect switching of the core. The two half currents are derived one from the brush 11 or 12 and the other from a commutator 17 which is driven in synchronism with the card sensing mechanism 10, and is arranged to supply a half current to each row of cores in turn, a row containing one core in each column, such as 15(9) and 16(9). Cores 15(N) and 16(N) are arranged to be set by a current of the same magnitude as the half current applied to the other cores, through one winding which, for this purpose, consists of a relatively greater number of turns of wire. Cores 15(Z) and 16(Z) are normally set and are arranged to be unset by a half current from the brushes 11 and 12 and a half current from cam actuated contacts 24 as explained later.

Considering core column 15 alone, information is entered, starting at 9 index point, as follows. The card sensing brush 11 may sense a hole at any one of the numeric index points 9 to 2, and if it does a circuit is completed through a wire 18 which is linked with all the column cores 15. This causes a half current to flow through the wire 18. A commutator 17, operating in synchronism with the card sensing mechanism, completes a circuit in turn to a group of wires 18*a*. Each of the wires 18*a* is linked with all the cores of a row. If the brush 11 senses a hole at the "8" index point, for example, the core 15(8) is set by half currents through the wire 18 and through the wire 18*a* linked with the cores 15(8) and 16(8). The core 15(N) is also set by the half current in the wire 18, since this wire has a two turn linkage with this core.

A relay 19 is provided and is arranged to control the setting of the cores 15(1N) and 15(1Z). A hole sensed at index point 1 may have a numeral or zone significance, according to whether a numeral hole is not or is sensed at any of the index points 9 to 2. The relay 19 is operated over a circuit from the brush 11 through a winding 19P of relay 19 and through cam-actuated contacts contacts 20, which are closed while index points 9 to 2 are being sensed. The energisation of winding 19P closes contacts 19A to complete an energising path for the hold winding 19H of relay 19 from the positive potential supply line 22 to the zero potential line 21 over cam actuated contacts 23 which are arranged to be closed while index points 9 to 1 are being sensed. Relay 19, once operated, is thus held operated until after index point 1 time and in its operated state it closes contacts 19B to complete a short circuit across core 15(1N), and it opens contacts 19C to interrupt a short circuit across core 15(1Z).

If now a hole is also sensed at 1 index point it can only have zone significance. Due to the operation of relay 19 the half current from commutator 17 at index point 1 will only be effective to set core 15(1Z), and core 15(1N) will be unaffected. If a hole is sensed at O, X, or Y times instead, the corresponding core 15(O), 15(X) or 15(Y) will be set in the same manner as the core 15(8). If no zone hole is sensed, the final state of core column 15 will be with cores 15(8) and 15(N) set, thus indicating that the setting of core 15(8) is of numeric significance.

In the event of no hole being sensed at any of index points 9 to 2 relay 19 is not energised and after the sensing of index point 2, cam actuated contacts 20 interrupt the possible energising circuit of winding 19P so that the subsequent sensing of a hole cannot operate relay 19. Under these circumstances the short circuit across core 15(1Z) is maintained and, if a hole is sensed at 1 index point, the core 15(1N) is set, since a hole at 1 index point can only have numeric significance if it is unaccompanied by a hole at any earlier index point.

Figure 4:
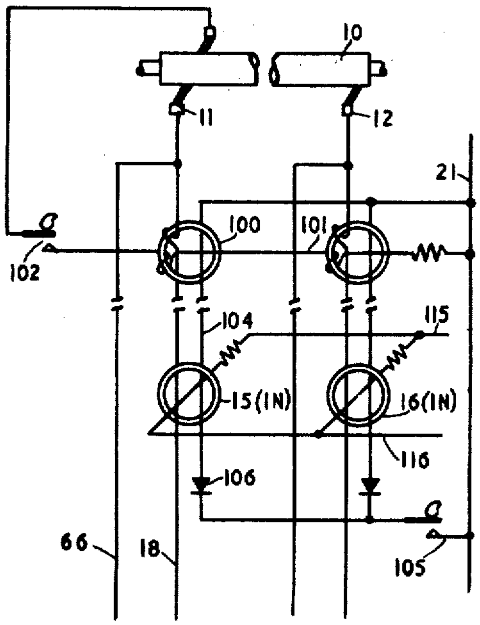
Figure 4 is a circuit diagram of a modification of a part of the apparatus.

The control of the core 15(1N) may alternatively be arranged by a modified circuit as shown in Figure 4. The relay 19 is not used, but a core 100 is provided in each column. The core 100 is set by a current applied to line 101 by cam-actuated contacts 102, which are closed, momentarily, before the index point 9 is sensed. The line 18 has a two-turn linkage with the core 100, which is thereby unset when a hole is sensed in the card. A cam-actuated contact 105 is operated during the sensing of index point 1 and provides a loop including the line 104 linking with the cores 100 and 15(1N). A diode 106 is provided in the line 104 to prevent the circulation of current through minor loops formed by lines 104 of other columns when the contacts 105 are broken. If a hole sensed at index point 1 is to be treated as having numeral significance no other numeral holes will have been sensed, and at index point 1 the core 100 is unset, half currents being applied by both lines 18 and 104 to the core 15(1N) which is therefore set. If a hole sensed at index point 1 is to be treated as having zone significance another numeral hole will already have been sensed, causing the core 100 to be unset, and no current flows through the line 104. It will be appreciated that the core 15(1Z) is set whenever a hole is sensed at index point 1.

As mentioned previously core 15(Z) is normally set and this core is arranged to be unset by the combined effect of a half current flowing through one unsetting winding under control of a cam-actuated contact 24, which is closed while index points 9—1 are being sensed, and a half current flowing through the wire 18 passes through the core 15(Z) in the opposite sense to that in which it passes through the other cores. Core 15(Z) is thus unset if a hole is sensed at any of index points 9 to 1, but remains set if no such hole is sensed. Thus, a single hole in the O, X or Y positions of a card column is registered by the setting of the appropriate core 15(O), 15(X) or 15(Y) and by the set state of core 15(Z). Immediately prior to the sensing of the 9 index point at the beginning of a card sensing cycle cam-actuated contacts 25 are closed momentarily to set core 15(Z) if it has been unset in a preceding cycle.

At the end of a card sensing cycle there will thus be at least two cores of the column set, one in the numeral group and the other in the zone group. The core 15(N)

may also be set in addition to two other cores, but as explained later, it does not control registration of a character under such circumstances. Cam actuated contacts 26 close at each index point to control the timing of the circuits through the sensing brushes and the commutator 17 from the supply line 22.

It will be appreciated that column 16 operates in the same manner as column 15 and it is provided with a relay and associated contacts, corresponding in function to relay 19.

At the end of a card sensing cycle all the data from the individual columns of the card is stored in the corresponding core columns and is available for read-out. Since no further entires can be made in the storage matrix until it has been cleared, a second matrix identical to that described above is provided so that data from a second card can be sensed and stored whilst read-out from the first matrix is taking place. This arrangement avoids any delay and, providing the printing mechanism operates slightly faster than the card sensing mechanism, it permits non-synchronised operation of the printing and sensing mechanisms.

The transfer of read-in from one matrix to the other is effected by a distributing device comprising the relays 27 and 28 and the associated cam actuated contacts 29, 30 and 31 in the following manner. At the start of an operation both relays 27 and 28 are unenergised and between the commencement of a cycle and 9 index point time in that cycle the break contacts 29 are opened and closed again, then the make contacts 30 are closed and opened again and finally the make contacts 31 are closed and remain closed, to a point towards the end of the cycle.

It will be appreciated that the distributing device may consist of any suitable circuits arranged to cause the selective operation of each matrix in turn as the result of a controlling signal, for example, diodes or other gating circuits.

In the first cycle of operations contacts 29 and 30 are actuated without effect and the closing of contacts 31 completes an energising circuit for winding 27P of relay 27. Relay 27, thus energised, closes contacts 27(1) to complete an energising circuit for its hold winding 27H so that although the circuit of 27P is interrupted by contacts 31 towards the end of the cycle, relay 27 is held energised by winding 27H and contacts 27(2) are maintained closed. At the beginning of a second cycle actuation of contacts 29 is again without effect, but this time the closing of contacts 30 completes an energising circuit for winding 28P of relay 28, and relay 28 operates to close contacts 28(1), to complete an energising circuit for its hold winding 28H. Relay 28 also opens contacts 28(2) to interrupt the circuit for the hold winding 27H of relay 27 so that towards the end of the cycle when contacts 31 open, relay 27 releases and opens contacts 27(1) and 27(2).

At the beginning of a third cycle contacts 29 are opened to interrupt the circuit of winding 28H so that relay 28 releases and the remainder of the cycle then follows that of the first cycle. Thus relay 28 is operated every other cycle and controls actuation of the changeover contacts 28(3) to 28(7) and contacts such as 28(11), 28(12), 28(13), 28(14) and 28(15) which are shown as break contacts in the matrix circuit illustrated and are duplicated, as make contacts in the other matrix which is indicated schematically at 107. The purpose of these make contacts and break contacts is to render the read-out arrangements within each matrix inoperative during read-in to such matrix, the common read-out arrangements and common read-in arrangements being switched by the change-over contacts 28(3) to 28(7) as will appear from the following description of the read-out operation.

As mentioned previously, after the first read-in cycle, during which data is stored in core columns 15 and 16, relay 28 is operated and remains operated for the whole of the second read-in cycle. Upon operation of relay 28, contacts 28(9) and 28(10) disconnect the core columns 15 and 16 from the brushes 11 and 12 and complete a direct connection between the lines such as 18 and a potential supply line 13 by short circuiting resistors 14. Similar changeover contacts in the other matrix 107 are operated in the reverse manner to connect the core columns of such matrix to the brushes 11 and 12. Contacts 28(11) are opened to break the line 18 between the numeral and zone sections of the core column 15, and contacts 28(12) perform the same function for the core column 16, contacts 28(13) complete a connection between the anodes of the thyratrons 32, 33 and an HT supply line 34, contacts 28(8) connect a pulse line 48 to the matrix for a purpose explained later. A similar change-over contact in the other matrix operates in the reverse manner to disconnect the pulse line 48. Contacts 28(3) to 28(7) switch the common read-out arrangements into connection with the cores of columns 15 and 16. This latter switching disconnects the common arrangements from the core rows of the other matrix 107. The contacts 28(14) and 28(15) break the short circuit across the cores 15(1Z) and 16(1Z) respectively, and are not provided when the modification shown in Figure 4 is used for control of the cores 15(1N) and 16(1N).

The common read-out arrangement comprises a group of thyratron valves 36 to 41 and an associated group of magnetic cores 42—45. The valves 36 to 40 are each associated with matrix cores of one row, e.g. valve 36 is associated with cores 15(9) and 16(9), valve 37 is associated with cores 15(8) and 16(8) and so on, and each of the cores 42 to 45 forms a storage coupling between adjacent pairs of thyratrons. Thyratron valve 41 controls the unsetting of the cores 42 to 45 and the whole arrangment is controlled by three sets of pulses applied over lines 47, 48 and 49.

Figure 3:
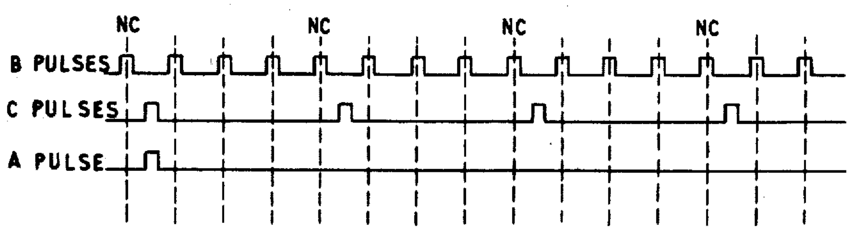
Figure 3 is a chart showing the relative pulse timings.

These sets of positive-going pulses, which will be referred to as A, B and C pulses, are produced by commutators 108, 109 and 110 synchronously with the rotation of the print wheels of the printing mechanism indicated schematically by the rectangle 50. The relative timings of these pulses are shown in Figure 3. An A pulse occurs for each revolution of the print wheels and is applied to line 47. A B pulse occurs as each character on the print wheel passes the printing lines and is applied to line 48. A C pulse occurs immediately after each B pulse corresponding to a numerical character (NC) and is applied to line 49. The A and C pulses occur between two B pulses, and the first C pulse of a revolution is coincident with the A pulse.

The valves 36 to 40 whose grids are connected to a source of bias potential 112, are triggered sequentially to switch the rows of cores in synchronism with the A, B and C pulses in the following manner. An HT supply line 46 is connected to the anode of the valve 41. Initially, a B pulse is applied over line 48 to trigger valve 41 and charge capacitor 51 and other similar capacitors associated with the valves 36 to 40, these capacitors being connected to the cathode of valve 41 through diodes, such as 54, and unsetting windings of the cores 42 to 45. All these cores are therefore unset. As the capacitors become charged the voltage across the valve 41 is reduced until it is insufficient to maintain the thyratron discharge and the valve is extinguished. A resistor 111 in parallel with the valve 41 provides a small continuous charging current to counteract leakage in the capacitors. The next C pulse is applied over line 49 which links with all the cores 42 to 45 and switches them to their set states. Hence, at the beginning of a read-out cycle the capacitors, such as 51, are all charged, and the cores 42 to 45 are all set.

It has been explained that the relay 28 connects the read-out arrangement either to the matrix illustrated in detail or to the other matrix 107. It will be assumed that the contacts 28(3) to 28(7) are operated and that the read-out takes place from the matrix illustrated in detail. The application of an A pulse, at the beginning of a read-out cycle, to line 47 triggers the valve 36, which discharges the capacitor 51. The discharge path is over lines 115 and 116, through resistors 52 and their associated windings linking with all the cores, such as 15(9) and 16(9), in a row. The current flowing through these windings is sufficient to unset a core which is already set. As the capacitor 51 discharges, the voltage across the valve 36 falls until it is insufficient to maintain the thyratron discharge and the valve 36 is extinguished.

The application of the next B pulse to line 48 again triggers thyratron 41, charging the capacitor 51 and unsetting core 42 in a similar manner to that already explained.

The application of the next C pulse to the line 49, now switches core 42 back again to its set state and in so doing generates an impulse in an output winding which is applied to trigger thyratron valve 37. The circuit of valve 37 is similar to that of valve 36 and includes a capacitor corresponding to capacitor 51 which is discharged when valve 37 is triggered and which is charged by the next B pulse on line 48 in the same way.

Thus, successive C pulses trigger valves 37 to 40 in turn, and in so doing apply unsetting pulses to the rows of matrix cores in turn. It will be appreciated that just as in practice there would be a row of matrix cores corresponding to each of the index points 9—1, instead of the exemplary rows shown in the drawing, so there would be a corresponding number of thyratron valves and storage cores in the common read-out arrangement.

Since the printing mechanism and the sensing mechanism may be asynchronous, the relay 28 may operate at any time during the read-out cycle. In order to preserve the correct sequence of triggering the valves 36 to 40 an alternative path is provided on each, similar to that consisting of resistor 53 associated with valve 36, so that if the contacts 28(3) to 28(7) are changing over when a valve is triggered the corresponding capacitor is discharged over the alternative path, and the sequence is uninterrupted. It will be appreciated that the read-out circuit may be connected to the matrix at any time in the cycle of the printing mechanism, but because the read-out cycle is in synchronism with the printing mechanism a resulting record is always accurately representative of the data stored in the matrix.

The common read-out circuit, of which the valves 36 to 40 are parts, forms an electronic commutator arranged to supply impulses to scan the rows of cores in the matrix in a predetermined sequence, and it will be apparent that this function may be performed by other suitable forms of commutator.

The effect of applying an unsetting impulse to each row of cores in turn to scan the matrix is to produce output pulses in the column circuits when cores which have been set during read-in are scanned by the unsetting impulses. Assuming that during read-in cores 15(8) and 15(N) and cores 16(2), 16(N) and 16(X) were set, the unsetting pulse resulting from the first A pulse would have no effect on cores 15(9) and 16(9) but the unsetting pulse resulting from the next C pulse, would unset core 15(8). This would produce an output pulse which is applied over line 18 and via the integrating circuit 32A, 32B (Figure 2) to the grid of thyratron 32 which then fires. The integrating circuit serves to distinguish between the output pulses due to switching of a set core and the short duration pulse produced by the disturbance of an unset core.

Diodes 32C and 33C prevent back circuits, which may be detrimental when a number of thyratrons corresponding to the thyratrons 32 and 33 are employed. If these diodes are not employed, current flow from the line 34, through the anode resistors of the thyratrons may raise the potential of the line 48 to an undesirable degree.

When the thyratron 32 is triggered, it draws current, to maintain the discharge, through the anode resistor. A B pulse on the line 48 now causes a substantial current to flow through the wire 18 linking the cores 15(N) to 15(Y), since the thyratron 32 presents a relatively low impedance.

The cores 15(N) to 15(Y) are coupled in chain formation by circuits such as that referenced 113 which couples the cores 15(N) and 15(1Z). The wire 18 operates during read-out as a shifting winding and the current flowing in it is applied to the cores in an unsetting direction to cause information stored in the cores to be shifted downwards in the column. For example, if core 15(N) is set, the flow of current through wire 18 causes it to be unset and a resultant pulse is generated in the circuit 113, which links with the core, to charge a capacitor 57 through a diode 55. At the end of the shifting pulse the capacitor 57 discharges through a path consisting of a resistor 56 and a winding linking with the adjacent core 15(1Z). The core 15(1Z) is thereby set, and the effect of this sequence of events is to shift a setting from core 15(N) to core 15(1Z). Since coupling circuits are provided between all adjacent pairs of cores in the chain, information is shifted in a similar manner throughout the chain each time a current flows through the shifting winding. Hence, each B pulse occurring after the triggering of the thyratron 32 causes a shift of the information stored on the cores 15(N) to 15(Y). The thyratron 32 is triggered by the output pulse from the resetting of core 15(8), in the present example. The next B pulse shifts the setting of the core 15(N) to the core 15(1Z). The shifting continues, so that the core 15(Y) is set after four B pulses. The fifth B pulse unsets the core 15(Y), producing an output pulse which is fed to the grid of a thyratron 60, via a diode 58 and a resistor 59.

The latter thyratron fires in response to this output pulse and feeds a control pulse to the printing mechanism 50 over line 61. Since the production of the A, B and C pulses is synchronous with the rotation of the type wheels of the printer, this control pulse is applied at a time when the numeral 8 is positioned for printing and the control pulse is used to actuate a type hammer in known manner.

The C pulses succeeding that which initiated scanning of cores 15(8) and 16(8) are ineffective until the occurrence of that C pulse controlling scanning of cores 15(2), and 16(2). This latter C pulse unsets core 16(2) and thyratron 33 is fired by the resultant output pulse in the manner previously described in connection with core 15(8). The firing of thyratron 33 permits the B pulses on line 35 to step the setting of the cores of the shifting register of column 16 so that the set condition of core 16(X) is shifted to core 16(Y) by the first B pulse, and then the second B pulse, produces an output pulse from core 16(Y) to fire thyratron 62. The latter thyratron generates a control pulse which is applied to the mechanism 50 over line 63 and controls printing of a character corresponding to the punching 2, X, in the original card.

The fifth B pulse produces a further output pulse from core 16(Y) due to the shifted setting of core 16(N) but since thyratron 62 has already responded to a previous output pulse the further pulse is ineffective.

It will be recalled that if the alternative circuit shown in Figure 4 is used for the control of the setting of cores such as 15(1N) the relay 19 is not used and consequently the short-circuiting path across cores such as 15(1Z), consisting of contacts 19C and 28(14) is not provided. The core 15(1Z) is then set whenever a hole is sensed in the record card at index point 1. Whenever mechanism is controlled as described. When, however, the index point 1 has numeral significance, an output pulse will occur one B pulse time earlier than in the case described above, because the core 15(1Z) is set as well as the core 15(N). This necessitates a rearrangement of the character on the printing mechanism in order to record a numeral 1 correctly.

The wire 18 passes through the core 15(Z) in the opposite sense, so that a negative output pulse is produced if this core is switched from the set to the unset state. In order to produce a positive output pulse to trigger the valve 32, a wire 66, which passes through the core, is connected to the one end of the resistor 32A through a diode 67. The combination of a diode 68 and a resistor 69 provide relatively low and high impedance for positive and negative pulses, respectively, on the line 18. A similar arrangement is provided for the core 16(Z).

It will be recalled that the read-in and read-out are asynchronous and that the operation of relay 28 at the end of a card sensing cycle may occur at any point in a revolution of the print wheels of the mechanism 50. Prior to the operation of relay 28 the common read-out arrangements will have been scanning the other matrix 107, which is initially empty, and then as relay 28 operates the changeover contacts 28(3) to 28(7) the scanning is transferred to the matrix shown in the drawings. If this transfer should occur between two C pulses the "B" pulses are ineffective to step the shifting register of cores in the zone section of the matrix until the next C pulse occurs because neither of thyratrons 32 or 33 can be fired until such C pulse occurs.

The read-out may, for example, start with cores 15(2) and 16(2) and continue with cores 15(1N), 16(1N), then cores 15(Z), 16(Z) and, on application of the next A pulse continue with cores 15(9), 16(9) and so on. It will be appreciated that with asynchronous operation it is essential that the read-out takes place a little more rapidly than read-in to allow for possible delay in waiting for the first C pulse. The maximum delay that can occur is one group of B pulses, so that the minimum speed difference required is ten per cent. There is no disadvantage in reading-out at a higher speed than the minimum as this will only result in some of the rows of cores being scanned a second time. Since the read-out is destructive no further output is produced by the second scan.

At the end of the next read-in cycle the release of relay 28 transfers the common read-out arrangement to the other matrix 107, removes HT from thyratrons 32 and 33 to extinguish them, and short circuits them out of their associated columns of cores. Release of relay 28 also disconnects the B pulses on line 48 from the shifting winding formed by the line 18 and reconnects this line to the card sensing brushes 11. The brushes 12 are similarly reconnected to column 16, so that the third read-in cycle stores data in the matrix constituted by these columns. Complementary effects are produced by corresponding contacts in the circuit of the other matrix store (not shown) and the printing control thyratrons 60 and 62 are connected to the Y cores of the other matrix through isolating diodes 64 and 65 so as to be fired by output pulses from such cores during read-out of the other matrix.

It will be appreciated that the magnetic cores may be replaced by other two-stage storage elements. For example, bi-stable triggers may be arranged in matrix formation, having input gates to cause them to respond to input pulses on co-ordinate lines and also being arranged to operate as shifting registers. Similarly ferroelectric storage elements may be arranged as a storage matrix.

In the foregoing description it has been assumed that the sensing of a record card starts at the 9 index point and continues through the remaining numeral index points, the zone index points being sensed towards the end of a cycle. In a case where sensing starts with the zone index points, these are followed by index point 1 and the remaining numerals 2 to 9 are sensed last. The circuit shown in Figure 4 may be modified in this case to exercise control over the setting of the core 1N in the following manner.

The core 100 is set by a cam actuated contact, such as 102 before sensing begins in each cycle. The setting circuit of core 1N consists of a half-current winding connected to the line 18 and a second half-current winding connected to the commutator 17 so that the core 1N is set if a hole is sensed at 1 index point. The core 100 is unset by a winding having a two-turn linkage with the core, and this winding is connected to line 18 in series with a cam-actuated contact, such as 105, closed during the sensing of index points 2 to 9. Hence, the core 100 is unset if a hole is sensed at an index point from 2 to 9. A linking winding, such as 104, is permanently provided between cores 100 and 1N and operates to unset the core 1N as the result of the unsetting of core 100. Thus the core 1N is set if the digit 1 has numeral significance but is unset if the digit 1 has zone significance i.e. if a second numeral hole is sensed in a card column already containing a hole at index point 1.

What I claim is:

1. An information storage and read out device comprising a first and a second group of storage elements arranged in rows and columns, each column including storage elements of both groups, means for setting to a first stable state an element in said first group and an element in said second group of a column, said two set elements jointly representing information to be entered, means for switching the elements of said first group to a second stable state in a predetermined sequence and for generating a first signal in response to the switching of an element from the first to the second stable state, means for generating a train of shift pulses, means for applying said shift pulses to all the elements of said second group of each of said columns, means for coupling said elements of said second group in a chain formation and thereby rendering said shift pulses effective to cause successive transfer of the settings of the elements of the chain formation to the last element of the chain formation under control of said signal, and means for deriving from said last core an output signal which is timed in relation to said shift pulses in accordance with the elements initially set by said setting means.

2. An information storage device comprising a first and a second group of magnetic storage cores of material having a substantially rectangular hysteresis characteristic, the cores being arranged in rows and columns, each column including cores of both groups, a group of first windings, each row having one of said first windings linked with all the cores of that row, a group of second windings, each column having one of said second windings linked with all the cores of that column, means for jointly energising selected ones of said first and second groups of windings to set to a first stable state a core in said first group of cores and a core in said second group of cores of a column, said two set cores jointly representing selected information to be entered, means for switching the cores of said first core group of said column to a second stable state in a predetermined sequence and for generating a first signal in response to the switching of a core from the first to the second stable state, means for generating a train of shift pulses, means for applying said shift pulses to all the cores of said second core group of each of said columns, means for coupling said cores of said second group in a chain formation and thereby rendering said shift pulses effective to cause successive transfer of the settings of the cores of the chain formation to the last core of the chain formation, under control of said signal, and means for deriving from said last core an output signal which is timed in relation to said shift pulses in accordance with the cores set by said energising means.

3. An information storage device comprising a first and a second group of magnetic storage cores of material having a substantially rectangular hysteresis characteristic, the cores being arranged in rows and columns, each column including cores of both groups, a group of first windings, each row having one of said first windings linked with all the cores of that row, a group of second windings, each column having one of said second windings linked with all the cores of that column, means for jointly energising selected ones of said first and second groups of windings to set to a first stable state a core in said first group of cores and a core in said second group of cores of a column, said two set cores jointly representing selected information to be entered, a cyclically operated recording device, means for switching the cores of said first core group of said column to a second stable state in a predetermined sequence under control of said recording device and for generating a signal in response to the switching of a core from the first to the second stable state, means for generating a train of pulses synchronised with said recording device, means for applying said pulses to all the cores of said second core group, means for coupling said cores of said second group in chain formation, means responsive to said signal from said first core group for rendering said train of pulses effective to cause sequential switching of the cores in said second group, means for generating an output signal, dependent on which of said cores of said second core group was set, in response to said sequential switching, and means for applying said output signal to said recording device.

4. Apparatus comprising at least two storage devices as claimed in claim 2, a distributing device for operating the energising means of each said storage device in turn, the distributing device also controlling the output signal generating means for each storage device in turn, and means controlled by said distributing device for preventing operation of said output signal generating means simultaneously with the operation of the energising means of the same storage device.

5. An information storage device as claimed in claim 2 in which said energizing means includes record card sensing means, means for energizing each of said second windings in accordance with data recorded in a column of a record card and switching means operable in synchronism with the record card sensing for energizing said first windings in a predetermined sequence.

6. An information storage device as claimed in claim 5 in which the information derived from the record card consists, in accordance with a statistical record card code, of a first part having a numerical significance and a second part having a zone significance and in which the relative timing of said output signal is representative of the combined significance of both the numerical and the zone parts.

7. An information storage device as claimed in claim 5, in which the information, according to a statistical record card code, includes a particular one part having a numerical or zone significance, said energizing means setting a core in either the first or the second group according to whether the said one part has a numerical or zone significance and also setting a second core in the other group of the same column which core is switchable to modify the relative timing of the said output signal.

8. An information storage device as claimed in claim 7 in which the said one part is given a numerical or zone significance in dependence upon whether or not another numerical part is entered in the same column.

9. An information storage device as claimed in claim 2 in which the said output signal is applied to a cyclically operating recording device, the said train of impulses being generated in synchronism with each cycle of operation of the recording device, and in which said energizing means and the recording device are asynchronous, the information being entered in synchronism with the information entry means and the output signal being applied to and in synchronism with the recording device.

10. An information storage device as claimed in claim 3 in which the information entry means is operated cyclically and in which the information entry means and the recording device are asynchronous, at least one recording cycle occurring for each entry cycle.

11. Apparatus comprising two information storage devices as claimed in claim 3, and means for operating said energizing means and applying an output signal to the said recording device alternately from each said storage device.

12. Apparatus as claimed in claim 11 in which the selection of one of said storage devices both for information entry and for the application of an output signal to the recording device is in synchronism with the operation of said energizing means and in which the recording cycle is less than the information entry cycle.

13. Apparatus as claimed in claim 12 in which the said means for sequentially switching the cores of said first group is common to the two storage devices and is connected to the storage devices alternately.

14. Apparatus as claimed in claim 3 in which the sequentially switching means comprises a chain of valves arranged to operate in sequence in response to a train of pulses derived from the recording device and applied to all the valves in common.

15. A device as claimed in claim 14 in which each valve when operated discharges a capacitor through a third winding linked with all the cores of a row.

16. A device as claimed in claim 15 in which a switching core is associated with each valve except the first in the chain, the discharge of a capacitor by a valve also serving to switch the core associated with the next higher valve in the chain to one stable state and in which the said train of pulses is applied to all the cores to switch them to a second stable state, the switching of a core from the first to the second stable state producing a pulse which is adapted to operate the associated valve.

17. A device as claimed in claim 3 in which said energizing means includes record card sensing means, means for energizing each of said second windings in accordance with data recorded in a column of a record card and second switching means operable in synchronism with the record card sensing means for energizing said first windings in a pre-determined sequence.

18. A device as claimed in claim 3 in which the recording device comprises a printing mechanism operated by timed impulses.

References Cited in the file of this patent

UNITED STATES PATENTS

| | | |
|---|---|---|
| 2,680,819 | Booth | June 8, 1954 |
| 2,730,695 | Ziffer | Jan. 10, 1956 |
| 2,750,580 | Rabenda et al. | June 12, 1956 |
| 2,774,429 | Rabenda | Dec. 18, 1956 |
| 2,807,664 | Kleinberg et al. | Sept. 24, 1957 |